United States Patent [19]

Biferno

[11] Patent Number: 4,568,928

[45] Date of Patent: Feb. 4, 1986

[54] FAIL TRANSPARENT ELECTRO-LUMINESCENT DISPLAY WITH BACKUP

[75] Inventor: Michael A. Biferno, Duarte, Calif.

[73] Assignee: McDonnell Douglas Corporation, Long Beach, Calif.

[21] Appl. No.: 494,961

[22] Filed: May 16, 1983

[51] Int. Cl.⁴ ............................................. G09G 3/36
[52] U.S. Cl. .................................... 340/716; 340/784; 340/781
[58] Field of Search ................ 340/716, 781, 784, 705

[56] References Cited

U.S. PATENT DOCUMENTS

| | | | |
|---|---|---|---|
| 4,134,104 | 1/1979 | Karras | 340/781 |
| 4,238,791 | 12/1980 | Hochstrate | 340/716 |
| 4,371,870 | 2/1983 | Biferno | 340/784 |
| 4,499,451 | 2/1985 | Suzuki et al. | 340/716 |

Primary Examiner—Marshall M. Curtis
Attorney, Agent, or Firm—Gregory A. Cone; George W. Finch; Donald L. Royer

[57] ABSTRACT

This display system comprises, front to rear, an electro-luminescent information bearing display element which is substantially transparent when not energized, a background element which is dark (opaque) when it is energized and substantially transparent when not energized, and a backup display means which is visible when the two front elements are not energized.

8 Claims, 3 Drawing Figures

FAIL TRANSPARENT ELECTRO-LUMINESCENT DISPLAY WITH BACKUP

BACKGROUND OF THE INVENTION

This invention relates to display systems and more particularly to electro-luminescent display systems. More particularly, this invention relates to multielement stacked display systems in which the different elements within the stack are selectively viewable.

The last decade has witnessed a phenomenal increase in the use of digital as opposed to analog electronic instrumentation systems. In turn, liquid crystal display devices have been widely employed as display means for these digital electronic instrumentation systems. The liquid crystal display is highly desirable since it is a low power device which exhibits high visual contrast and it is adapted for a variety of different digital formats such as conventional alphanumeric and dot matrix displays. A few of the increasingly diverse uses to which liquid crystal displays have been put include aircraft flight control displays, automobile instrumentation, alphanumeric readouts for electronic calculators, wrist watches, electronic game displays, etc.

In particular, liquid crystal displays are being increasingly utilized as instrument displays in aircraft. It is particularly important in aircraft usages that redundant instrumentation be employed; hence, it is common for a primary instrument display to be presented in a central location while a redundant instrument supplying the same information will be necessarily located at some remote location within the cockpit of the aircraft. The problem, then, occurs when a failure occurs in the primary flight instrument display and the pilot is forced to look away from the centrally located primary display to view the corresponding backup instrument in a remote location. The disruption to the pilot's concentration in such circumstances can be quite severe and detrimental to the safe operation of the aircraft.

It is clear, therefore, that in aircraft, as well as many other digital display usages, it would be highly desirable to be able to employ a primary display which would become transparent to the viewer, either upon power failure or the intentional disablement of the device, thereby enabling the viewer to observe other displays located directly behind the now transparent primary display. In the liquid crystal technology, one such system has now been patented as U.S. Pat. No. 4,371,870, issued to the inventor of the present invention. However, further development has demonstrated that in many situations the visual contrast provided by the liquid crystal display is inadequate in some lighting situations, particularly in an aircraft cockpit during night-time operations.

SUMMARY OF THE INVENTION

The stacked display system of this invention comprises three functional elements. The first element is an electro-luminescent display means which is disposed as the closest element in the stack to the viewer of the display system. This electro-luminescent display can present information to the viewer in a variety of formats. Unlike conventional electro-luminescent displays, this electro-luminescent display element must become effectively transparent to the veiwer when it is not energized. The second element is a background element which is located behind the electro-luminescent display such that the background appears substantially dark and opaque to the viewer when it is energized. When it is not energized, the background means becomes substantially transparent. Normally, the background and electro-luminescent elements will be activated or inactivated simultaneously. The third element in the display stack is a backup display means which becomes visible to the viewer when the electro-luminescent display and the background means are not energized.

DETAILED DESCRIPTION OF THE INVENTION

Figure 1:
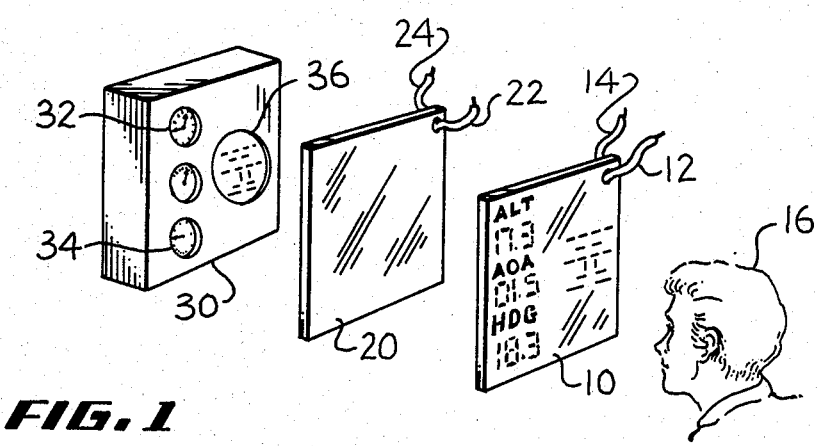
FIG. 1 is an isometric representation of the basic construction of one embodiment of this display system.

The general organization of this display system is shown in FIG. 1. Closest to the viewer 16 is the electro-luminescent display element 10, behind which is the background means 20. Behind the background means 20 is found the backup display 30. The electro-luminescent display means as shown in this figure has several different displays contained therein; here shown as an altitude readout, an angle of attack readout, a heading readout, and a graphic aircraft orientation display. The various display elements are independently addressable via the alternating current input and output wires 12 and 14. The background means 20 is shown here as a nematic phase liquid crystal cell powered by input and output alternating current lines 22 and 24. The backup gauges 30 are standard electromechanical instruments in this embodiment corresponding to the various readouts on the electro-luminescent display 10.

Figure 2:
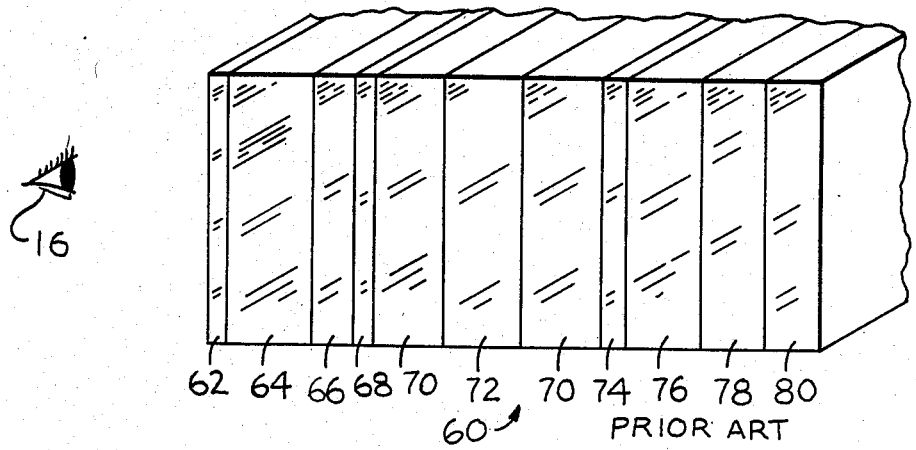
FIG. 2 is a cut away isometric view of a prior art electro-luminescent display; and, FIG. 3 is a cut away isometric view of an embodiment of the electro-luminescent display element utilized in the present invention.

The electro-luminescent display is especially effective for use in display systems in environments with widely varying light levels. At high light levels the intensity of the display may be turned up, while in low light levels the intensity may be turned down. It has advantages over corresponding liquid crystal displays since the electro-luminescent display is an active light emitting display rather than a reflective display such as a liquid crystal display, which often requires some form of supplemental lighting. The prior art electro-luminescent displays are designed as stand-along displays. Their designers have not contemplates that it would be useful to employ them in a transparent mode when unenergized. One such prior art electro-luminescent display is shown in FIG. 2. It should be understood that this isometric cutaway view represents only a small portion of the overall display, since the electro-luminescent display as contemplated for use with this invention will have a multiplicity of independently energizable areas within the larger display itself. In this manner alphanumeric or pixel elements may be independently energized and read. Also, it is possible to provide for different colored elements, dedicated pictorial elements, large homogeneous areas, and segmented symbols with electro-luminescent displays.

FIG. 2 presents a rather standard layout for a prior art electro-luminescent display. Relative to the viewer 16, the layers are a first anti-reflective coating 62 and then the glass substrate 64 on which the display is formed. The next layer is an ion isolation layer which keeps ions from the outside surfaces of the display from penetrating further to the interior of the display. Next comes a transparent electrode layer 68 followed by a combination ion barrier/current limiter layer 70 which protects the internal luminescent layer 72 which is formed normally from a zinc sulfide manganese doped material. Next comes another combination ion barrier/current limiter layer 70, then another transparent electrode 74, followed by a passivation layer, normally of silicon dioxide, followed by a black layer to enhance the contrast of the device 78 and a back layer 80 which provides mechanical protection for the rear surface of the prior art electro-luminescent display panel. The last two layers 78 and 80 enable this electro-luminescent device to stand alone but prevent its use with the present invention.

Figure 3:
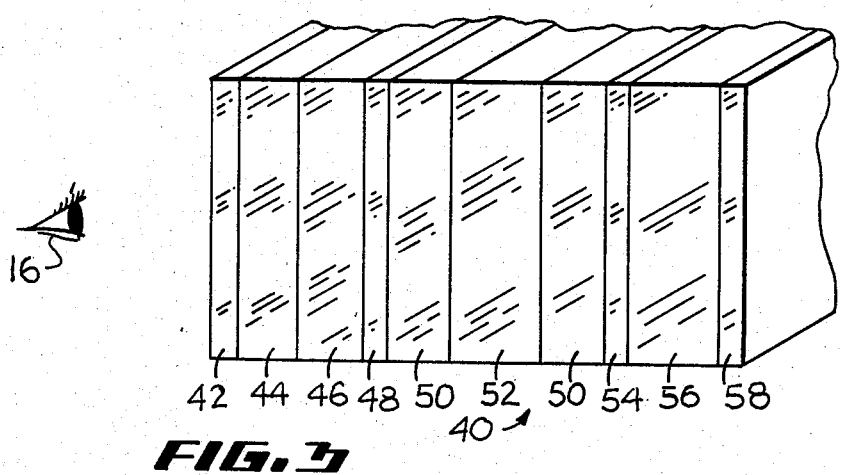

FIG. 3 shows one configuration for a portion of an electro-luminescent display which is useful in conjunction with one embodiment of the present invention. Relative to the viewer 16 there is a first anti-reflection layer 42 emplaced on the base glass substrate 44 on to which the other layers are formed. The next layer is an ion barrier layer 46 followed by a transparent electrode layer 48. The next layer is a combination ion barrier/current limiter layer 50 which protects the internal zinc sulfide manganese doped electro-luminescent layer 52. Next comes another ion barrier/current limiter layer 50 followed by another transparent electrode layer 54. Next comes another transparent passivation layer followed by a final anti-reflectivity coating layer 58. In this construction there is no layer within the electro-luminescent display itself which remains dark or black under all conditions as there is in the prior art electro-luminescent display shown in FIG. 2. This being the case, when the electro-luminescent display of FIG. 3 is in a non energized state, the entire display will be substantially transparent. Of course, as the transparent electrodes 48 and 54 are energized with the proper alternating current excitation voltage, the electro-luminescent layer 52 will emit light and activate this portion of the overall electro-luminescent display.

Returning to FIG. 1, it is anticipated that in most embodiments the background layer 20 will comprise a twisted nematic liquid crystal cell. The construction of these twisted nematic liquid crystal cells is well known in the art and will not be discussed further here other than to note that when it is energized, the twisted cell will present a substantially dark aspect to the viewer. In its unenergized position, the twisted cell will be substantially transparent to the viewer. The most common example of this type of twisted nematic cell is to be found on the multitudes of digital liquid crystal display wrist watches which have appeared in the last few years. The digits on the displays of these watches comprise twisted nematic cells which, when energized, appear dark and black, and when non energized, are transparent. Most such twisted nematic cells employ a single liquid crystal layer in conjunction with at least one polarizing film. Since the polarizing film acts to reduce the light intensity somewhat, it may be preferable in some embodiments to replace the polarizing film with a second liquid crystal layer which has its polarization at 90 degrees to the polarization of the first liquid crystal element when both are activated. In this way the attenuation from the polarizing film would be avoided. Of course, both liquid crystal elements in the background layer would be transparent when the background layer is not energized.

The backup display shown as element 30 in FIG. 1 will normally be a redundant analog display corresponding to the digital displays on the front electro-luminescent display panel 10. However, the invention is not necessarily limited to these sorts of embodiments since the backup display could also be further digital electro-luminescent displays, liquid crystal displays, or the like. Also, it is not necessary that the backup display present information which is redundant to that found on the front electro-luminescent display 10.

By allowing at least two display systems to be stacked one upon the other, the display system of this invention enables an instrumentation designer to achieve a much more space efficient display. The viewer of the instrument display also benefits since, in the event of an instrument failure, the redundant instrument appears automatically at the same location as the now failed but transparent front electro-luminescent display. In other other embodiments, it is also possible to compress a multitude of the different displays into vertically stacked displays which may be independently accessed by the viewer.

I claim:
1. A display system comprising:
electro-luminescent display means disposed as the information-bearing element of the system which is closest to a viewer of the system presenting information within at least one information location on the electro-luminescent display means when energized and such that, when the electro-luminescent display is not energized, the electro-luminescent display is effectively transparent wherein the electro-luminescent display means comprises an intermediate layer of a transparent electroluminescent material held between two transparent electrode layers;
background means disposed behind the electro-luminescent display means relative to the viewer such that the background means appears substantially dark to the viewer when the electro-luminescent display is energized and effectively transparent when the electro-luminescent display is not energized wherein the background means comprises a liquid crystal display means comprising a layer of liquid crystal material held between two transparent electrode layers, the liquid crystal display means providing a uniform dark area behind each energized information-bearing area of the electro-luminescent display; and
backup display means disposed behind the background means relative to the viewer such that the backup display is visible to the viewer when the electro-luminescent display means and the background means are not energized.

2. The system of claim 1 wherein the background means comprises twisted nematic liquid crystal cell means.

3. The system of claim 2 wherein the twisted nematic liquid crystal cell means comprises two twisted nematic liquid crystal cells disposed such that, when both cells are energized, their polarization vectors are about 90 degrees apart, resulting in a substantially dark aspect, and, when both cells are not energized, the background means is substantially transparent.

4. The system of claim 1 wherein the electro-luminescent display means comprises an alphanumeric display.

5. The system of claim 1 wherein the electro-luminescent display means comprises a grid of independently energizable pixel elements.

6. The system of claim 1 wherein the electro-luminescent display means comprises a multicolored display.

7. The system of claim 1 wherein the electro-luminescent display means comprises at least one dedicated pictorial image.

8. The system of claim 1 wherein the electro-luminescent display means comprises at least one symbol comprising a plurality of independently energizable segments.

* * * * *